(12) United States Patent
Landon et al.

(10) Patent No.: US 7,687,121 B2
(45) Date of Patent: Mar. 30, 2010

(54) INSULATED GLASS UNIT WITH SEALANT COMPOSITION HAVING REDUCED PERMEABILITY TO GAS

(75) Inventors: Shayne J. Landon, Ballston Lake, NY (US); David A. Williams, Gansevoort, NY (US); Vikram Kumar, Bangalore (IN); Edward J. Nesakumar, Bangalore (IN); Indumothi Ramakrishnan, Bangalore (IN)

(73) Assignee: Momentive Performance Materials Inc., Albany, NY (US)

( * ) Notice: Subject to any disclaimer, the term of this patent is extended or adjusted under 35 U.S.C. 154(b) by 895 days.

(21) Appl. No.: 11/336,950

(22) Filed: Jan. 20, 2006

(65) Prior Publication Data

US 2008/0020154 A1    Jan. 24, 2008

(51) Int. Cl.
*E06B 3/00* (2006.01)
(52) U.S. Cl. .......... 428/34; 428/429; 428/447; 524/588; 528/34
(58) Field of Classification Search .......... 428/34, 428/429, 447
See application file for complete search history.

(56) References Cited

U.S. PATENT DOCUMENTS

| | | | |
|---|---|---|---|
| 2,920,095 A | 1/1960 | Clarence et al. | |
| 4,131,589 A | 12/1978 | Smith, Jr. | |
| 4,138,387 A | 2/1979 | Bluestein | |
| 4,533,714 A | 8/1985 | Sebag et al. | |
| 4,699,940 A | 10/1987 | Gerace et al. | |
| 4,710,411 A | 12/1987 | Gerace et al. | |
| 4,833,225 A | 5/1989 | Schaefer et al. | |
| 4,891,166 A | 1/1990 | Schaefer et al. | |
| 4,892,918 A | 1/1990 | Ryang | |
| 5,026,890 A | 6/1991 | Webb et al. | |
| 5,094,831 A | 3/1992 | Klockner et al. | |
| 5,120,379 A | 6/1992 | Noda et al. | |
| 5,130,396 A | 7/1992 | Panster et al. | |
| 5,266,631 A | 11/1993 | Arai et al. | |
| 5,567,530 A | 10/1996 | Drujon et al. | |
| 5,576,054 A | 11/1996 | Brown | |
| 5,591,818 A | 1/1997 | Standke et al. | |
| 5,653,073 A | 8/1997 | Palmer | |
| 5,665,368 A | 9/1997 | Lentini et al. | |
| 5,744,703 A * | 4/1998 | Krenceski et al. | .......... 73/54.01 |
| 5,760,121 A | 6/1998 | Beall et al. | |

(Continued)

FOREIGN PATENT DOCUMENTS

EP    0520777    12/1992

(Continued)

OTHER PUBLICATIONS

Shelly D. Burnside et al., Synthesis and Properties of New Poly(dimelthylsiloxane) Nanocomposites, ACS Publications, vol. 7, Sep. 1995, p. 1597-1600.*

(Continued)

*Primary Examiner*—Alicia Chevalier
*Assistant Examiner*—Walter Moore
(74) *Attorney, Agent, or Firm*—Dominick G. Vicari

(57) ABSTRACT

The invention relates to a high thermal efficiency, insulated glass unit structure sealed with a cured composition containing, inter alia, diorganopolysiloxane(s) and inorganic-organic nanocomposite(s), the cured composition exhibiting low permeability to gas(es).

15 Claims, 4 Drawing Sheets

U.S. PATENT DOCUMENTS

| | | | |
|---|---|---|---|
| 5,804,253 A | 9/1998 | Hagiwara et al. | |
| 5,849,832 A | 12/1998 | Virnelson et al. | |
| 5,853,886 A | 12/1998 | Pinnavaia et al. | |
| 5,855,972 A | 1/1999 | Kaeding | |
| 5,866,645 A | 2/1999 | Pinnavaia et al. | |
| 5,972,448 A | 10/1999 | Frisk et al. | |
| 5,993,769 A | 11/1999 | Pinnavaia et al. | |
| 6,055,783 A | 5/2000 | Guhl et al. | |
| 6,096,803 A | 8/2000 | Pinnavaia et al. | |
| 6,136,446 A | 10/2000 | Virnelson et al. | |
| 6,136,910 A | 10/2000 | Virnelson et al. | |
| 6,150,425 A | 11/2000 | Sekine et al. | |
| 6,150,441 A | 11/2000 | Chiba et al. | |
| 6,153,691 A * | 11/2000 | Gornowicz et al. | 524/861 |
| 6,225,394 B1 | 5/2001 | Lan et al. | |
| 6,232,388 B1 | 5/2001 | Lan et al. | |
| 6,238,755 B1 | 5/2001 | Harvey et al. | |
| 6,262,162 B1 | 7/2001 | Lan et al. | |
| 6,284,360 B1 | 9/2001 | Johnson et al. | |
| 6,301,858 B1 | 10/2001 | Crandell | |
| 6,372,827 B2 | 4/2002 | Johnson et al. | |
| 6,376,591 B1 | 4/2002 | Lan et al. | |
| 6,380,295 B1 | 4/2002 | Ross et al. | |
| 6,387,996 B1 | 5/2002 | Lan et al. | |
| 6,391,449 B1 | 5/2002 | Lan et al. | |
| 6,399,690 B2 | 6/2002 | Lan et al. | |
| 6,406,782 B2 | 6/2002 | Johnson et al. | |
| 6,407,155 B1 | 6/2002 | Qian et al. | |
| 6,410,635 B1 | 6/2002 | Kaylo et al. | |
| 6,445,158 B1 | 9/2002 | Bertness et al. | |
| 6,457,294 B1 | 10/2002 | Virnelson et al. | |
| 6,486,253 B1 | 11/2002 | Gilmer et al. | |
| 6,521,690 B1 | 2/2003 | Ross et al. | |
| 6,596,803 B2 | 7/2003 | Lan et al. | |
| 6,653,388 B1 | 11/2003 | Barbee et al. | |
| 6,686,002 B2 | 2/2004 | Auerbach et al. | |
| 6,713,547 B2 | 3/2004 | Barbee et al. | |
| 6,730,766 B2 | 5/2004 | Schattenmann et al. | |
| 6,784,272 B2 | 8/2004 | Mack et al. | |
| 6,787,592 B1 | 9/2004 | Powell et al. | |
| 6,796,102 B2 | 9/2004 | Virnelson et al. | |
| 6,803,412 B2 | 10/2004 | Nguyen-Misra et al. | |
| 6,812,272 B2 | 11/2004 | Fischer | |
| 6,822,035 B2 | 11/2004 | Chaiko | |
| 6,828,370 B2 | 12/2004 | Lan et al. | |
| 6,828,403 B2 | 12/2004 | Mahdi et al. | |
| 6,858,665 B2 | 2/2005 | Larson | |
| 6,881,798 B2 | 4/2005 | Choi et al. | |
| 6,887,931 B2 | 5/2005 | Twardowska et al. | |
| 6,889,480 B2 | 5/2005 | Guhl et al. | |
| 6,914,095 B2 | 7/2005 | Lorah et al. | |
| 2002/0091186 A1 | 7/2002 | Auerback | |
| 2002/0100550 A1 | 8/2002 | Mahdi et al. | |
| 2002/0119266 A1 | 8/2002 | Bagrodia et al. | |
| 2002/0165305 A1 | 11/2002 | Knudson et al. | |
| 2002/0194813 A1 | 12/2002 | Virnelson et al. | |
| 2003/0095906 A1 | 5/2003 | Bauer et al. | |
| 2004/0127629 A1 | 7/2004 | Jacob et al. | |
| 2004/0149370 A1 | 8/2004 | Auerbach | |
| 2004/0171482 A1 | 9/2004 | Pinnavaia et al. | |
| 2004/0180154 A1 | 9/2004 | Wang et al. | |
| 2004/0180155 A1 | 9/2004 | Nguyen-Misra | |
| 2004/0188016 A1 | 9/2004 | Mahdi et al. | |
| 2004/0210074 A1 | 10/2004 | Hupfield et al. | |
| 2004/0229751 A1 | 11/2004 | Pinnavaia et al. | |
| 2005/0113498 A1 | 5/2005 | Auerbach | |
| 2005/0187305 A1 * | 8/2005 | Briell | 516/110 |
| 2005/0192387 A1 | 9/2005 | Williams et al. | |
| 2005/0203235 A1 | 9/2005 | Gong et al. | |
| 2005/0228101 A1 * | 10/2005 | McMahon et al. | 524/442 |
| 2005/0249033 A1 | 11/2005 | Krause | |
| 2006/0199890 A1 | 9/2006 | Fasulo et al. | |
| 2007/0116907 A1 | 5/2007 | Landon et al. | |
| 2007/0117926 A1 | 5/2007 | Landon et al. | |
| 2007/0160781 A1 | 7/2007 | Landon et al. | |
| 2007/0173596 A1 | 7/2007 | Landon et al. | |
| 2007/0173597 A1 | 7/2007 | Williams et al. | |
| 2007/0178256 A1 | 8/2007 | Landon | |
| 2007/0178257 A1 | 8/2007 | Landon | |
| 2007/0179236 A1 | 8/2007 | Landon | |
| 2007/0179242 A1 | 8/2007 | Landon | |
| 2008/0020154 A1 | 1/2008 | Landon et al. | |

FOREIGN PATENT DOCUMENTS

| | | |
|---|---|---|
| EP | 0857761 | 8/1998 |
| EP | 0994151 | 4/2000 |
| EP | 1457527 | 9/2004 |
| GB | 2249552 | 5/1992 |
| JP | 2006/287014 | 10/1994 |
| WO | WO 97/15619 A1 | 5/1997 |
| WO | WO 97/31057 | 8/1997 |
| WO | WO 02064676 | 8/2002 |
| WO | WO 2004/056913 | 7/2004 |
| WO | WO 2004/113429 | 12/2004 |
| WO | WO 2005/066261 | 7/2005 |
| WO | WO 2007/081898 | 7/2007 |

OTHER PUBLICATIONS

Academic Press Dictionary of Science and Technology, [online], No month, 1992, Oxford: Elsevier Science and Technology, Retrieved from the Internet: www.credoreference.com/entry/apdst/quaternary_amonium_salt on Jun. 24, 2009.*

Peter C. LeBaron et al., "Clay Nanolayer Reinforcement of a Silicone Elastomer", Aug. 2001.

Shelly D. Burnside et al., "Nanostructure and Properties of Polysiloxane-Layered Silicate Nanocomposites", Mar. 28, 2000.

K. Mizoguchi et al., "Miscibility and gas permeability of poly (ethylene-co-5,4 mol% 3,5,5-trimethylhexyl methacrylate)-polydimethyl-siloxane blends", 1997.

Y. Geerts et al., "Morphology and Permeability of Polymer Blends-I. Crosslinked EPDM-Silicone Blends", Feb. 1996.

Kaneko et al., "Preparation of a Clay Pillared with Rodlike Cationic Polysiloxane", *Chem. Lett.*, vol. 33; 2004, pp. 1486-1487.

Johnson et al., "Silylation of a Tubular Aluminosilicate Polymer (Imogolite) by Reaction with Hydrolyzed (γ-Aminopropyl)triethoxysilane", *Langmuir*, vol. 6:2, 1990, pp. 307-311.

Johnson et al., "Hydroysis of (γ-Aminopropyl) triethoxysilane-Silylated Imogolite and Formation of Silylated Tubular Silicate-Layered Silicate Nanocomposite", *Langmuir*, vol. 7:11, 1991, pp. 2636-2641.

* cited by examiner

ARGON PERMEABILITY COEFFICIENT IN BARRERS

INSULATED GLASS UNIT WITH SEALANT COMPOSITION HAVING REDUCED PERMEABILITY TO GAS

FIELD OF THE INVENTION

This invention is generally related to thermally insulating structures, and more particularly to a high thermal efficiency, insulated glass unit structure sealed with a room temperature-cured composition exhibiting low permeability to gas, or mixtures of gases.

BACKGROUND OF THE INVENTION

Insulating glass units (IGU) commonly have two panels of glass separated by a spacer. The two panels of glass are placed parallel to each other and sealed at their periphery such that the space between the panels, or the inner space, is completely enclosed. The inner space is typically filled with air. The transfer of energy through an insulating glass unit of this typical construction is reduced, due to the inclusion of the insulating layer of air in the inner space, as compared to a single panel of glass. The energy transfer may be further reduced by increasing the separation between the panels to increase the insulating blanket of air. There is a limit to the maximum separation beyond which convection within the air between the panels can increase energy transfer. The energy transfer may be further reduced by adding more layers of insulation in the form of additional inner spaces and enclosing glass panels. For example three parallel spaced apart panels of glass separated by two inner spaces and sealed at their periphery. In this manner the separation of the panels is kept below the maximum limit imposed by convection effects in the airspace, yet the overall energy transfer can be further reduced. If further reduction in energy transfer is desired then additional inner spaces can be added.

Additionally, the energy transfer of sealed insulating glass units may be reduced by substituting the air in a sealed insulated glass window for a denser, lower conductivity gas. Suitable gases should be colorless, non-toxic, non-corrosive, non-flammable, unaffected by exposure to ultraviolet radiation, and denser than air, and of lower conductivity than air. Argon, krypton, xenon, and sulfur hexaflouride are examples of gases which are commonly substituted for air in insulating glass windows to reduce energy transfer.

Various types of sealants are currently used in the manufacture of insulated glass units including both curing and non-curing systems. Liquid polysulphides, polyurethanes and silicones represent curing systems, which are commonly used, while polybutylene-polyisoprene copolymer rubber based hot melt sealants are commonly used non-curing systems.

Liquid polysulphides and polyurethanes are generally two component systems comprising a base and a curing agent that are then mixed just prior to application to the glass. Silicones may be one component as well as two component systems. Two component systems require a set mix ratio, two-part mixing equipment and cure time before the insulating glass units can be moved onto the next manufacturing stage.

However, current RTC silicone sealant compositions, while effective to some extent, still have only a limited ability to prevent the loss of low thermal conductivity gas, e.g., argon, from the inner space of an IGU. As a result of this permeability, the reduced energy transfer maintained by the gas between the panels of glass is lost over time.

A need therefore exists for an IGU with a RTC composition of reduced gas permeability compared to that of known RTC compositions. When employed as the sealant for an IGU, an RTC composition of reduced gas permeability will retain the intra-panel insulating gas of an IGU for a longer period of time compared to that of a more permeable RTC composition and will therefore extend the insulating properties of the IGU over a longer period of time.

SUMMARY OF THE INVENTION

The present invention relates to an insulated glass unit with increased thermal insulation stability. Specifically, the present invention relates to an insulated glass unit which comprises at least two spaced-apart sheets (panes) of glass, or of other functionally equivalent material, in spaced relationship to each other, a low thermal conductivity gas therebetween and a gas sealant assembly including a cured, i.e., crosslinked or vulcanized, curable sealant composition comprising:
  a) at least one silanol-terminated diorganopolysiloxane;
  b) at least one crosslinker for the silanol-terminated diorganopolysiloxane(s);
  c) at least one catalyst for the crosslinking reaction;
  d) a gas barrier enhancing amount of at least one inorganic-organic nanocomposite, and, optionally,
  e) at least one solid polymer having a permeability to gas that is less than the permeability of the crosslinked diorganopolysiloxane(s).

When used as a component of the gas sealant assembly of an IGU, the foregoing cured sealant composition reduces the loss of gas(es) from the IGU thus extending its useful service life.

DETAILED DESCRIPTION OF THE INVENTION

In accordance with the present invention, an insulated glass unit comprising increased thermal insulation stability is provided with at least two spaced-apart sheets of glass in spaced relationship to each other, a low thermal conductivity insulating gas or mixture of gases therebetween and a gas sealant element including a cured sealant composition resulting from the curing of a curable sealant composition comprising: a) at least one silanol-terminated diorganopolysiloxane; b) at least one crosslinker for the silanol-terminated diorganopolysiloxane(s); c) at least one catalyst for the crosslinking reaction; d) a gas barrier enhancing amount of at least one inorganic-organic nanocomposite filler; and, optionally, e) at least one solid polymer having a permeability to gas that is less than the permeability of the crosslinked diorganopolysiloxane(s).

Figure 1:
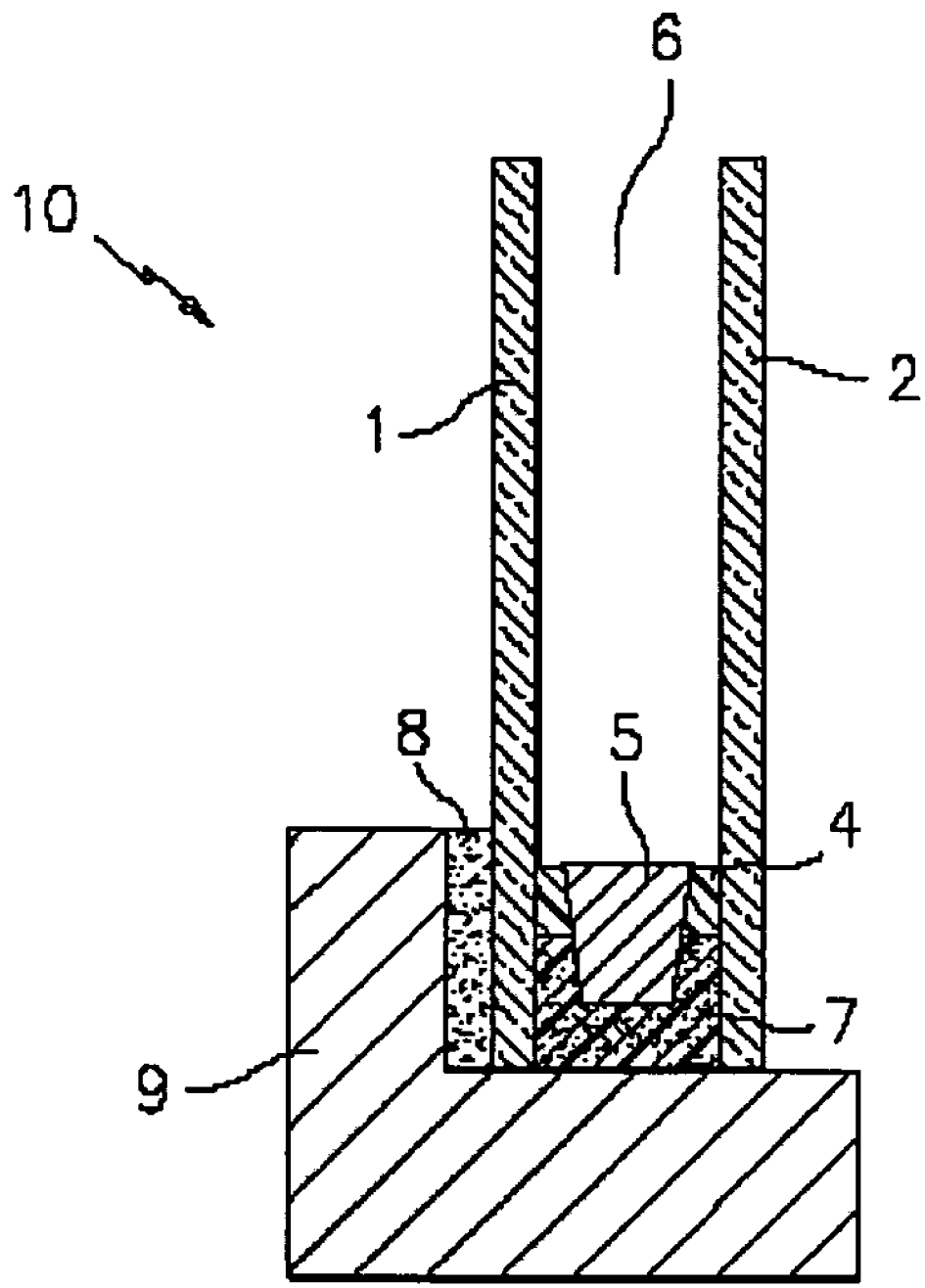
FIG. 1 is a sectional side view of a double glazed insulated glass unit (IGU) possessing a gas sealant assembly which includes a cured sealant composition in accordance with the invention.

With reference to FIG. 1, insulated glass unit 10 of known and conventional construction includes glass sheets 1 and 2 maintained in spaced-apart relationship by a gas sealant assembly possessing a primary gas sealant member 4, continuous spacer member 5 and low gas permeable sealant composition 7 prepared as hereinafter described, space 6 between sheets 1 and 2 being filled with an insulating gas or gases such as argon. A glazing bead 8, as known in the art, is placed between glass sheets 1 and 2 and window frame 9. Panes 1 and 2 can be fabricated from any of a variety of materials such as glass, e.g., clear float glass, annealed glass, tempered glass, solar glass, tinted glass, e.g., low energy glass, etc., acrylic resin and polycarbonate resin, and the like.

The inclusion of cured sealant composition 7 in the foregoing gas sealant assembly provides improved gas barrier characteristics and moisture leakage characteristics relative to known and conventional gas sealants. As a result, cured sealant composition 7 provides for longer in-service performance of insulated glass units of all manner of construction including that specifically described above.

Primary sealant member 4 of the insulated glass unit can be comprised of polymeric materials known in the art, for example, rubber base materials such as polyisobutylene, butyl rubber, polysulfide, EPDM rubber, nitrile rubber, and the like. Other useful materials include, polyisobutylene/polyisoprene copolymers, polyisobutylene polymers, brominated olefin polymers, copolymers of polisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, styrene butadiene polymers, and the like.

As indicated above, primary gas sealant member 4 can be fabricated from a material such as polyisobutylene which has very good sealing properties. Glazing bead 8 is a sealant that is sometimes referred to as the glazing bedding and can be provided in the form of a silicone or butyl rubber. A desiccant can be included in continuous spacer 5 in order to remove moisture from the insulating gas occupied space between glass panes 1 and 2. Useful desiccants are those that do not adsorb the insulating gas/gases filling the interior of the insulated glass unit.

Suitable low thermal conductivity gases and mixtures of such gases for use in the insulated glass unit are well know and include transparent gases such as air, carbon dioxide, sulfur hexafluoride, nitrogen, argon, krypton, xenon, and the like, and mixtures thereof.

Suitable silanol-terminated diorganopolysiloxanes (a) include those of the general formula:

$$M_a D_b D'_c$$

wherein "a" is 2, and "b" is equal to or greater than 1 and "c" is zero or positive; M is $$(HO)_{3-x-y}R^1_x R^2_y SiO_{1/2}$$

wherein "x" is 0, 1 or 2 and "y" is either 0 or 1, subject to the limitation that x+y is less than or is equal to 2, $R^1$ and $R^2$ each independently is a monovalent hydrocarbon group up to 60 carbon atoms; D is $$R^3 R^4 SiO_{1/2};$$

wherein $R^3$ and $R^4$ each independently is a monovalent hydrocarbon group up to 60 carbon atoms; and D' is $$R^5 R^6 SiO_{2/2}$$

wherein $R^5$ and $R^6$ each independently is a monovalent hydrocarbon group up to 60 carbon atoms.

Suitable crosslinkers (b) for the silanol-terminated diorganopolysiloxane(s) present in the composition of the invention include alkylsilicates of the general formula:

$$(R^{14}O)(R^{15}O)(R^{16}O)(R^{17}O)Si$$

wherein $R^{14}$, $R^{15}$, $R^{16}$ and $R^{17}$ each independently is a monovalent hydrocarbon group up to 60 carbon atoms. Crosslinkers of this type include, n-propyl silicate, tetraethylortho silicate and methyltrimethoxysilane and similar alkyl-substituted alkoxysilane compounds, and the like.

Suitable catalysts (c) for the crosslinking reaction of the silanol-terminated diorganopolysiloxane(s) can be any of those known to be useful for facilitating the crosslinking of such siloxanes. The catalyst can be a metal-containing or non-metallic compound. Examples of useful metal-containing compounds include those of tin, titanium, zirconium, lead, iron cobalt, antimony, manganese, bismuth and zinc.

In one embodiment of the present invention, tin-containing compounds useful as crosslinking catalysts include dibutyltindilaurate, dibutyltindiacetate, dibutyltindimethoxide, tinoctoate, isobutyltintriceroate, dibutyltinoxide, soluble dibutyl tin oxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates, and the like. Useful titanium-containing catalysts include chelated titanium compounds, e.g., 1,3-propanedioxytitanium bis(ethylacetoacetate); di-isopropoxytitanium bis(ethylacetoacetate), and tetraalkyl titanates, e.g., tetra n-butyl titanate and tetraisopropyl titanate. In yet another embodiment of the present invention, diorganotin bis β-diketonates is used for facilitating crosslinking in silicone sealant composition.

Inorganic-organic nanocomposite (d) of the present invention is comprised of at least one inorganic component which is a layered inorganic nanoparticulate and at least one organic component which is a quaternary ammonium organopolysiloxane.

When describing the invention, the following terms have the following meanings, unless otherwise indicated.

Definitions

The term "exfoliation" as used herein describes a process wherein packets of nanoclay platelets separate from one another in a polymer matrix. During exfoliation, platelets at the outermost region of each packet cleave off, exposing more platelets for separation.

The term "gallery" as used herein describes the space between parallel layers of clay platelets. The gallery spacing changes depending on the nature of the molecule or polymer occupying the space. An interlayer space between individual nanoclay platelets varies, again depending on the type of molecules that occupy the space.

The term "intercalant" as used herein includes any inorganic or organic compound capable of entering the clay gallery and bonding to its surface.

The term "intercalate" as used herein designates a clay-chemical complex wherein the clay gallery spacing has increased due to the process of surface modification. Under the proper conditions of temperature and shear, an intercalate is capable of exfoliating in a resin matrix.

As used herein, the term "intercalation" refers to a process for forming an intercalate.

The expression "inorganic nanoparticulate" as used herein describes layered inorganic material, e.g., clay, with one or more dimensions, such as length, width or thickness, in the nanometer size range and which is capable of undergoing ion exchange.

The expression "low permeability to gas(es)" as applied to the cured composition of this invention shall be understood to mean an argon permeability coefficient of not greater than about 900 barrers (1 barrer=$10^{-10}$ (STP)/cm sec(cmHg)) measured in accordance with the constant pressure variable-volume method at a pressure of 100 psi and temperature of 25° C.

The expression "modified clay" as used herein designates a clay material, e.g., nanoclay, which has been treated with any inorganic or organic compound that is capable of undergoing ion exchange reactions with the cations present at the interlayer surfaces of the clay.

The term "nanoclay" as used herein describes clay materials that possess a unique morphology with one dimension being in the nanometer range. Nanoclays can form chemical complexes with an intercalant that ionically bonds to surfaces in between the layers making up the clay particles. This association of intercalant and clay particles results in a material which is compatible with many different kinds of host resins permitting the clay filler to disperse therein.

As used herein, the term "nanoparticulate" refers to particle sizes, generally determined by diameter, less than about 1000 nm.

As used herein, the term "platelets" refers to individual layers of the layered material.

The inorganic nanoparticulate of the present invention can be natural or synthetic such as smectite clay, and should have certain ion exchange properties as in smectite clays, rectorite, vermiculite, illite, micas and their synthetic analogs, including laponite, synthetic mica-montmorillonite and tetrasilicic mica.

The nanoparticulates can possess an average maximum lateral dimension (width) in a first embodiment of between about 0.01 μm and about 10 μm, in a second embodiment between about 0.05 μm and about 2 μm, and in a third embodiment between about 0.1 μm and about 1 μm. The average maximum vertical dimension (thickness) of the nanoparticulates can in general vary in a first embodiment between about 0.5 nm and about 10 nm and in a second embodiment between about 1 nm and about 5 nm.

Useful inorganic nanoparticulate materials of the invention include natural or synthetic phyllosilicates, particularly smectic clays such as montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, talc, mica, kaolinite, vermiculite, halloysite, aluminate oxides, or hydrotalcites, micaceous minerals such as illite and mixed layered illite/smectite minerals such as rectorite, tarosovite, ledikite and admixtures of illites with one or more of the clay minerals named above. Any swellable layered material that sufficiently sorbs the organic molecules to increase the interlayer spacing between adjacent phyllosilicate platelets to at least about 5 angstroms, or to at least about 10 angstroms, (when the phyllosilicate is measured dry) can be used in producing the inorganic-organic nanocomposite of the invention.

The modified inorganic nanoparticulate of the invention is obtained by contacting quantities of layered inorganic particulate possessing exchangeable cation, e.g., $Na^+$, $Ca^{2+}$, $Al^{3+}$, $Fe^{2+}$, $Fe^{3+}$, and $Mg^{2+}$, with at least one ammonium-containing organopolysiloxane. The resulting modified particulate is inorganic-organic nanocomposite (d) possessing intercalated organopolysiloxane ammonium ions.

The ammonium-containing organopolysiloxane must contain at least one ammonium group and can contain two or more ammonium groups. The quaternary ammonium groups can be position at the terminal ends of the organopolysiloxane and/or along the siloxane backbone. One class of useful ammonium-containing organopolysiloxane has the general formula:

wherein "a" is 2, and "b" is equal to or greater than 1 and "c" is zero or positive; M is

wherein "x" is 0, 1 or 2 and "y" is either 0 or 1, subject to the limitation that x+y is less than or equal to 2, "z" is 2, $R^1$ and $R^2$ each independently is a monovalent hydrocarbon group up to 60 carbons; $R^3$ is selected from the group consisting of H and a monovalent hydrocarbon group up to 60 carbons; $R^4$ is a monovalent hydrocarbon group up to 60 carbons; D is

where $R^5$ and $R^6$ each independently is a monovalent hydrocarbon group up to 60 carbon atoms; and D' is

where $R^7$ and $R^8$ each independently is a monovalent hydrocarbon group containing amine with the general formula:

wherein "a" is 2, $R^9$ is selected from the group consisting of H and a monovalent hydrocarbon group up to 60 carbons; $R^{10}$ is a monovalent hydrocarbon group up to 60 carbons.

In another embodiment of the present invention, the ammonium-containing organopolysiloxane is $R^{11}$ $R^{12}$ $R^{13}N$, wherein $R^{11}$, $R^{12}$, and $R^{13}$ each independently is an alkoxy silane or a monovalent hydrocarbon group up to 60 carbons. The general formula for the alkoxy silane is

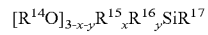

wherein "x" is 0, 1 or 2 and "y" is either 0 or 1, subject to the limitation that x+y is less than or equal to 2; $R^{14}$ is a monovalent hydrocarbon group up to 30 carbons; $R^{15}$ and $R^{16}$ are independently chosen monovalent hydrocarbon groups up to 60 carbons; $R^{17}$ is a monovalent hydrocarbon group up to 60 carbons. Additional compounds useful for modifying the inorganic component of the present invention are amine compounds or the corresponding ammonium ion with the structure $R^{18}$ $R^{19}$ $R^{20}N$, wherein $R^{18}$, $R^{19}$, and $R^{20}$ each independently is an alkyl or alkenyl group of up to 30 carbon atoms, and each independently is an alkyl or alkenyl group of up to 20 carbon atoms in another embodiment, which may be the same or different. In yet another embodiment, the organic molecule is a long chain tertiary amine where $R^{18}$, $R^{19}$ and $R^{20}$ each independently is a 14 carbon to 20 carbon alkyl or alkenyl.

The layered inorganic nanoparticulate compositions of the present invention need not be converted to a proton exchange form. Typically, the intercalation of an organopolysiloxane ammonium ion into the layered inorganic nanoparticulate material is achieved by cation exchange using solvent and solvent-free processes. In the solvent-based process, the organopolysiloxane ammonium component is placed in a solvent that is inert toward polymerization or coupling reaction. Particularly suitable solvents are water or water-ethanol, water-acetone and like water-polar co-solvent systems. Upon removal of the solvent, the intercalated particulate concentrates are obtained. In the solvent-free process, a high shear blender is usually required to conduct the intercalation reaction. The inorganic-organic nanocomposite may be in a suspension, gel, paste or solid forms.

A specific class of ammonium-containing organopolysiloxanes are those described in U.S. Pat. No. 5,130,396 the entire contents of which are incorporated by reference herein and can be prepared from known materials including those which are commercially available.

The ammonium-containing organopolysiloxanes of U.S. Pat. No. 5,130,396 is represented by the general formula:

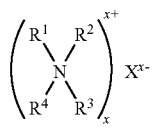

(I)

in which $R^1$ and $R^2$ are identical or different and represent a group of the formula:

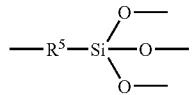

(II)

in which the nitrogen atoms in (I) are connected to the silicon atoms in (II) via the $R^5$ groups and $R^5$ represents an alkylene group with 1 to 10 carbon atoms, a cycloalkylene group with 5 to 8 atoms or a unit of the general formula:

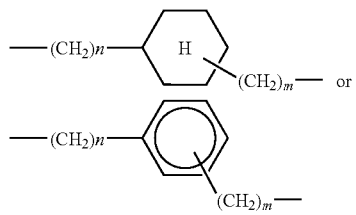

in which n is a number from 1 to 6 and indicates the number of methylene groups in nitrogen position and m is a number from 0 to 6 and the free valences of the oxygen atoms bound to the silicon atom are saturated as in silica skeletons by silicon atoms of other groups of formula (II) and/or with the metal atoms of one or more of the cross-linking binding links

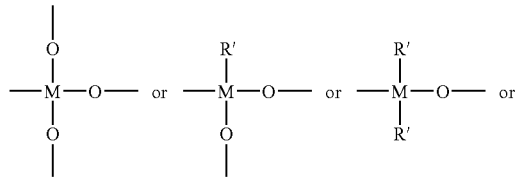

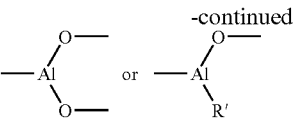

in which M is a silicon, titanium or zirconium atom and R' a linear or branched alkyl group with 1 to 5 carbon atoms and the ratio of the silicon atoms of the groups of formula (II) to the metal atoms in the binding links is 1: 0 to and in which $R^3$ is equal to $R^1$ or $R^2$, or hydrogen, or a linear or branched alkyl group of 1 to 20 carbon atoms, a cycloalkyl group of 5 to 8 carbon atoms or is the benzyl group, and $R^4$ is equal to hydrogen, or a linear or branched alkyl group with 1 to 20 carbon atoms or is a cycloalkyl, benzyl, alkyl, propargyl, chloroethyl, hydroxyethyl, or chloropropyl group consisting of 5 to 8 carbon atoms and X is an anion with the valence of x equal to 1 to 3 and selected from the group of halogenide, hypochlorite, sulfate, hydrogen sulfate, nitrite, nitrate, phosphate, dihydrogen phosphate, hydrogen phosphate, carbonate, hydrogen carbonate, hydroxide, chlorate, perchlorate, chromate, dichromate, cyanide, cyanate, rhodanide, sulfide, hydrogen sulfide, selenide, telluride, borate, metaborate, azide, tetrafluoroborate, tetraphenylborate, hexaflourophosphate, formate, acetate, propionate, oxalate, triflouroacetate, trichloroacetate or benzoate.

The ammonium-containing organopolysiloxane compounds described herein are macroscopically spherical shaped particles with a diameter of 0.01 to 3.0 mm, a specific surface area of 0 to 1000 $m^2$/g, a specific pore volume of 0 to 5.0 ml/g, a bulk density of 50 to 1000 g/l as well as a dry substance basis in relation to volume of 50 to 750 g/l.

One method of preparing an ammonium-containing organopolysiloxane involves reacting a primary, secondary, or tertiary aminosilane possessing at least one hydrolysable alkoxy group, with water, optionally in the presence of a catalyst, to achieve hydrolysis and subsequent condensation of the silane and produce amine-terminated organopolysilane which is thereafter quaternized with a suitable quarternizing reactant such as a mineral acid and/or alkyl halide to provide the ammonium-containing organopolysiloxane. A method of this type is described in aforesaid U.S. Pat. No. 5,130,396. In this connection, U.S. Pat. No. 6,730,766, the entire contents of which are incorporated by reference herein, describes processes for the manufacture of quaternized polysiloxane by the reaction of epoxy-functional polysiloxane.

In a variation of this method, the primary, secondary or tertiary aminosilane possessing hydrolysable alkoxy group (s) is quaternerized prior to the hydrolysis condensation reactions providing the organopolysiloxane. For example, ammonium containing N-trimethoxysilylpropyl-N,N,N-trimethylammonium chloride, N-trimethoxysilylpropyl-N,N,N-tri-n-butylammonium chloride, and commercially available ammonium-containing trialkoxysilane octadecyldimethyl(3-trimethyloxysilylpropyl) ammonium chloride (available from Gelest, Inc.) following their hydrolysis/condensation will provide ammonium-containing organopolysiloxane for use herein.

Other suitable tertiary aminosilane useful for preparing ammonium-containing organopolysiloxane include tris(triethoxysilylpropyl)amine, tris(trimethoxysilylpropyl)amine, tris(diethoxymethylsilylpropyl)amine, tris(tripropoxysilylpropyl)amine, tris(ethoxydimethylsilylpropyl)amine, tris(triethoxyphenylsilylpropyl)amine, and the like.

Still another method for preparing the ammonium-containing organopolysiloxane calls for quarternizing a primary, secondary, or tertiary amine-containing organopolysiloxane with quarternizing reactant. Useful amine-containing organopolysiloxanes include those of the general formula:

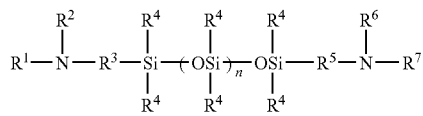

wherein $R^1$, $R^2$ $R^6$, and $R^7$ each independently is H, hydrocarbyl of up to 30 carbon atoms, e.g., alkyl, cycloalkyl, aryl, alkaryl, aralkyl, etc., or $R^1$ and $R^2$ together or $R^6$ and $R^7$ together form a divalent bridging group of up to 12 carbon atoms, $R^3$ and $R^5$ each independently is a divalent hydrocarbon bridging group of up to 30 carbon atoms, optionally containing one or more oxygen and/or nitrogen atoms in the chain, e.g., straight or branched chain alkylene of from 1 to 8 carbons such as —$CH_2$—, —$CH_2CH_2$—, —$CH_2CH_2CH_2$—, —$CH_2$—$C(CH_3)$—$CH_2$—, —$CH_2CH_2CH_2CH_2$—, etc., each $R^4$ independently is an alkyl group, and n is from 1 to 20 and advantageously is from 6 to 12.

These and similar amine-containing organopolysiloxanes can be obtained by known and conventional procedures e.g., by reacting an olefinic amine such as allyamine with a polydiorganosiloxane possessing Si—H bonds in the presence of a hydrosilation catalyst, such as, a platinum-containing hydrosilation catalyst as described in U.S. Pat. No. 5,026,890, the entire contents of which are incorporated by reference herein.

Specific amine-containing organopolysiloxanes that are useful for preparing the ammonium-containing organopolysiloxanes herein include the commercial mixture of

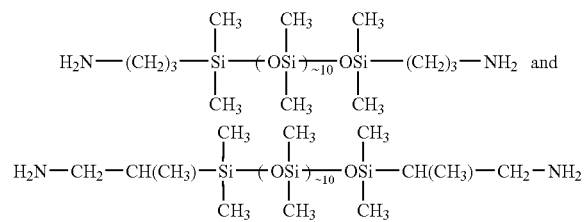

Optionally, the curable sealant composition herein can also contain at least one solid polymer (e) having a permeability to gas that is less than the permeability of the crosslinked diorganopolysiloxane. Suitable polymers include polyethylenes such as low density polyethylene (LDPE), very low density polyethylene (VLDPE), linear low density polyethylene (LLDPE) and high density polyethylene (HDPE); polypropylene (PP), polyisobutylene (PIB), polyvinyl acetate(PVAc), polyvinyl alcohol (PVoH), polystyrene, polycarbonate, polyester, such as, polyethylene terephthalate (PET), polybutylene terephthalate (PBT), polyethylene napthalate (PEN), glycol-modified polyethylene terephthalate (PETG); polyvinylchloride (PVC), polyvinylidene chloride, polyvinylidene floride, thermoplastic polyurethane (TPU), acrylonitrile butadiene styrene (ABS), polymethylmethacrylate (PMMA), polyvinyl fluoride (PVF), Polyamides (nylons), polymethylpentene, polyimide (PI), polyetherimide (PEI), polether ether ketone (PEEK), polysulfone , polyether sulfone, ethylene chlorotrifluoroethylene, polytetrafluoroethylene (PTFE), cellulose acetate, cellulose acetate butyrate, plasticized polyvinyl chloride, ionomers (Surtyn), polyphenylene sulfide (PPS), styrene-maleic anhydride, modified polyphenylene oxide (PPO), and the like and mixture thereof.

The optional polymer(s) can also be elastomeric in nature, examples include, but are not limited to ethylene-propylene rubber (EPDM), polybutadiene, polychloroprene, polyisoprene, polyurethane (TPU), styrene-butadiene-styrene (SBS), styrene-ethylene-butadiene-styrene (SEEBS), polymethylphenyl siloxane (PMPS), and the like.

These optional polymers can be blended either alone or in combinations or in the form of coplymers, e.g. polycarbonate-ABS blends, polycarbonate polyester blends, grafted polymers such as, silane grafted polyethylenes, and silane grafted polyurethanes.

In one embodiment of the present invention, the curable composition contains a polymer selected from the group consisting of low density polyethylene (LDPE), very low density polyethylene (VLDPE), linear low density polyethylene (LLDPE), high density polyethylene (HDPE), and mixtures thereof. In another embodiment of the invention, the curable composition has a polymer selected from the group consisting of low density polyethylene (LDPE), very low density polyethylene (VLDPE), linear low density polyethylene (LLDPE), and mixture thereof. In yet another embodiment of the present invention, the optional polymer is a linear low density polyethylene (LLDPE).

The curable sealant composition can contain one or more other fillers in addition to inorganic-organic nanocomposite component (d). Suitable additional fillers for use herein include precipitated and colloidal calcium carbonates which have been treated with compounds such as stearic acid or stearate ester; reinforcing silicas such as fumed silicas, precipitated silicas, silica gels and hydrophobized silicas and silica gels; crushed and ground quartz, alumina, aluminum hydroxide, titanium hydroxide, diatomaceous earth, iron oxide, carbon black, graphite, mica, talc, and the like, and mixtures thereof.

The curable sealant composition of the present invention can also include one or more alkoxysilanes as adhesion promoters. Useful adhesion promoters include N-2-aminoethyl-3-aminopropyltriethoxysilane, γ-aminopropyltriethoxysilane, γ-aminopropyltrimethoxysilane, aminopropyltrimethoxysilane, bis-γ-trimethoxysilypropyl) amine, N-phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, and N-ethyl-3-trimethoxysilyl-2-methylpropanamine, and the like. In one embodiment, the adhesion promoter can be a combination of n-2-aminoethyl-3-aminopropyltrimethoxysilane and 1,3,5-tris(trimethoxysilylpropyl)isocyanurate.

The compositions of the present invention can also include one or more non-ionic surfactants such as polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof.

The curable sealant compositions of the present invention can include still other ingredients that are conventionally employed in RTC silicone-containing compositions such as colorants, pigments, plasticizers, antioxidants, UV stabilizers, biocides, etc., in known and conventional amounts provided they do not interfere with the properties desired for the cured compositions.

The amounts of silanol-terminated diorganopolysiloxane(s), crosslinker(s), crosslinking catalyst(s), inorganic-oranic nanocomposite(s), optional solid polymers(s) of lower gas permeability than the crosslinked diorganopolysiloxane(s), optional filler(s) other than inorganic-organic nanocomposite, optional adhesion promoter(s) and optional ionic surfactant(s) can vary widely and, advantageously, can be selected from among the ranges indicated in the following table. The curable compositions herein contain inorganic-organic nanocomposite in an amount, of course, that enhances its gas barrier properties.

TABLE 1

Ranges of Amounts (Weight Percent) of Components of the Curable Composition of the Invention

| Components of the Curable Composition | First Range | Second Range | Third Range |
|---|---|---|---|
| Silanol-terminated Diorganopolysiloxane(s) | 50-99 | 70-99 | 80-85 |
| Crosslinker(s) | 0.1-10 | 0.3-5 | 0.5-1.5 |
| Crosslinking Catalyst(s) | 0.001-1 | 0.003-0.5 | 0.005-0.2 |
| Inorganic-organic Nanocomposite(s) | 0.1-50 | 10-30 | 15-20 |
| Solid Polymer(s) of Lower Gas Permeability than Crosslinked Dioganopoly-Siloxane(s) | 0-50 | 5-40 | 10-35 |
| Filler(s) other than Inorganic-organic Nanocomposite | 0-90 | 5-60 | 10-40 |
| Silane Adhesion Promoter(s) | 0-20 | 0.1-10 | 0.5-2 |
| Ionic Surfactant(s) | 0-10 | 0.1-5 | 0.5-0.75 |

The cured sealant compositions herein can be obtained by procedures that are well known in the art, e.g., melt blending, extrusion blending, solution blending, dry mixing, blending in a Banbury mixer, etc., in the presence of moisture to provide a substantially homogeneous mixture.

Preferably, the methods of blending the diorganopolysiloxane polymers with polymers may be accomplished by contacting the components in a tumbler or other physical blending means, followed by melt blending in an extruder. Alternatively, the components can be melt blended directly in an extruder, Brabender or any other melt blending means.

Cured sealant composition 7 is obtained by curing the curable composition obtained by mixing (a) at least one diorganopolysiloxane, (b) at least one crosslinker for the diorganopolysiloxane(s), (c) at least one catalyst for the crosslinking reaction, (d) at least one inorganic-organic nanocomposite and, optionally, (e) at least one solid polymer having a permeability to gas that is less than the permeability of the crosslinked diorganopolysiloxane(s), the composition following curing exhibiting low permeability to gas(es).

The invention is illustrated by the following non-limiting examples.

COMPARATIVE EXAMPLE 1 AND EXAMPLES 1-2

Inorganic-organic nanocomposite was prepared by first placing 10 g of amino propyl terminated siloxane ("GAP 10," siloxane length of 10, from GE Silicones, Waterford, USA) in a 100 ml single-necked round bottomed flask and adding 4 ml of methanol available from Merck. 2.2 ml of concentrated HCl was added very slowly with stirring. The stirring was continued for 10 minutes. 900 ml of water was added to a 2000 ml three-necked round-bottomed flask fitted with condenser and overhead mechanical stirrer. 18 g of Cloisite $Na^+$ (natural montmorillonite available from Southern Clay Products) clay was added to the water very slowly with stirring (stirring rate approximately 250 rpm). The ammonium chloride solution (prepared above) was then added very slowly to the clay-water mixture. The mixture was stirred for 1 hour and let stand overnight. The mixture was filtered through a Buckner funnel and the solid obtained was slurried with 800 ml of methanol, stirred for 20 minutes, and then the mixture was filtered. The solid was dried in oven at 80° C. for approximately 50 hours.

To provide a 2.5 weight percent nanocomposite, 224.25 g of OMCTS (octamethylcyclotetrasiloxane) and 5.75 g of GAP 10 modified clay (inorganic-organic nanocomposite prepared above) were introduced into a three-necked round bottom flask fitted with overhead stirrer and condenser. The mixture was stirred at 250 rpm for 6 hours at ambient temperature. The temperature was increased to 175° C. while stirring continued. 0.3 g of CsOH in 1 ml of water was added in the reaction vessel through septum. After 15 minutes, polymerization of OMCTS began and 0.5 ml of water was added with an additional 0.5 ml of water being added after 5 minutes. Heating and stirring were continued for 1 hour after which 0.1 ml of phosphoric acid was added for neutralization. The pH of the reaction mixture was determined after 30 minutes. Stirring and heating were continued for another 30 minutes and the pH of the reaction mixture was again determined to assure complete neutralization. Distillation of cyclics was carried out at 175° C. and the mixture was thereafter cooled to room temperature.

The same procedure was followed with 5 weight percent of GAP 10 modified clay.

In-situ polymerization procedures were followed with 2.5 wt % and 5 wt % (see Table 1) GAP 10 modified clays (prepared above). The in-situ polymers with different amounts of clay were then used to make cured sheets as follows: In-situ silanol-terminated polydimethylsiloxanes (PDMS), (Silanol 5000, a silanol-terminated polydimethylsiloxane of 5000 cs nominal and Silanol 50,000, a silanol-terminated polydimethylsiloxane of 50,000 cs nominal, both available from Gelest, Inc.) GAP 10 modified clay formulations were mixed with NPS (n-propyl silicate, available from Gelest, Inc.) crosslinker and solubilized DBTO (solubilized dibutyl tin oxide, available from GE silicones, Waterford, USA) catalyst using a hand blender for 5-7 min with air bubbles being removed by vacuum. The mixture was then poured into a Teflon sheet-forming mold and maintained for 24 hours under ambient conditions (25° C. and 50% humidity). The partially cured sheets were removed from the mold after 24 hours and maintained at ambient temperature for seven days for complete curing.

TABLE 1

|  | grams | wt % NPS | wt % DBTO |
|---|---|---|---|
| Comparative Example 1 Silanol | 50 | 2 | 1.2 |
| Example 1: Silanol with 2.5 wt % of modified clay | 50 | 2 | 1.2 |
| Example 2: Silanol with 5 wt % of modified clay | 50 | 2 | 1.2 |

The Argon permeability was measured using a gas permeability set-up. Argon permeability was measured using a gas permeability set-up as in the previous examples. The measurements were based on the variable-volume method at 100 psi pressure and at a temperature of 25° C. Measurements were repeated under identical conditions 2-3 times in order to assure their reproducibility.

Figure 2:
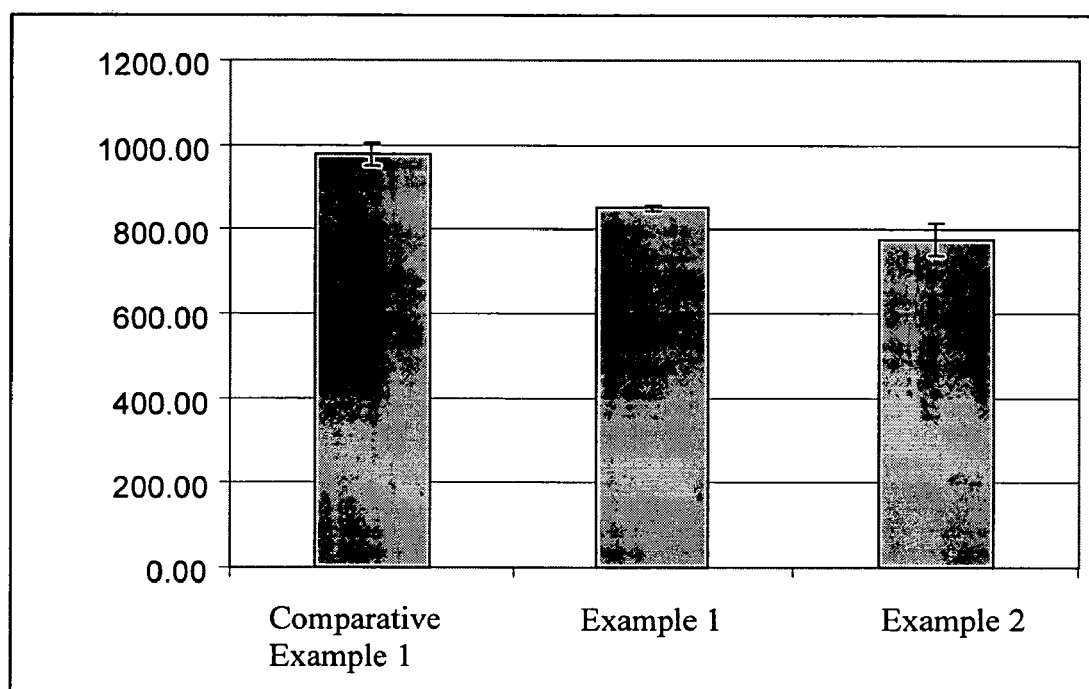
FIG. 2 is a graphic presentation of permeability data for the sealant compositions of Comparative Example 1 and Examples 1 and 2.

The permeability data for Comparative Example 1 and Examples 1 and 2 are graphically presented in FIG. 2.

COMPARATIVE EXAMPLE 2 AND EXAMPLE 3

Example 3 (see Table 2) was prepared by mixing 45 grams of PDMS and 5 grams of GAP 10 modified clay (prepared above) and similar in-situ polymerization procedures were followed by mixing with 2 wt % NPS, and 1.2 wt % DBTO, using a hand blender for 5-7 minutes with air bubbles being removed by vacuum. Each blend was poured into a Teflon sheet-forming mold and maintained for 24 hours under ambient conditions (25° C. and 50% humidity) to partially cure the PDMS components. The partially cured sheets were removed from the mold after 24 hours and maintained at ambient temperature for seven days for complete curing.

TABLE 2

|  | grams | wt % NPS | wt % DBTO |
|---|---|---|---|
| Comparative Example 2: Silanol mixture | 50 | 2 | 1.2 |
| Example 3: Silanol with 5 wt % of modified clay | 50 | 2 | 1.2 |

The Argon permeability was measured using a gas permeability set-up as in the previous examples. Argon permeability was measured using a gas permeability set-up as in the previous examples. The measurements were based on the variable-volume method at 100 psi pressure and at a temperature of 25° C. Measurements were repeated under identical conditions 2-3 times in order to assure their reproducibility.

Figure 3:
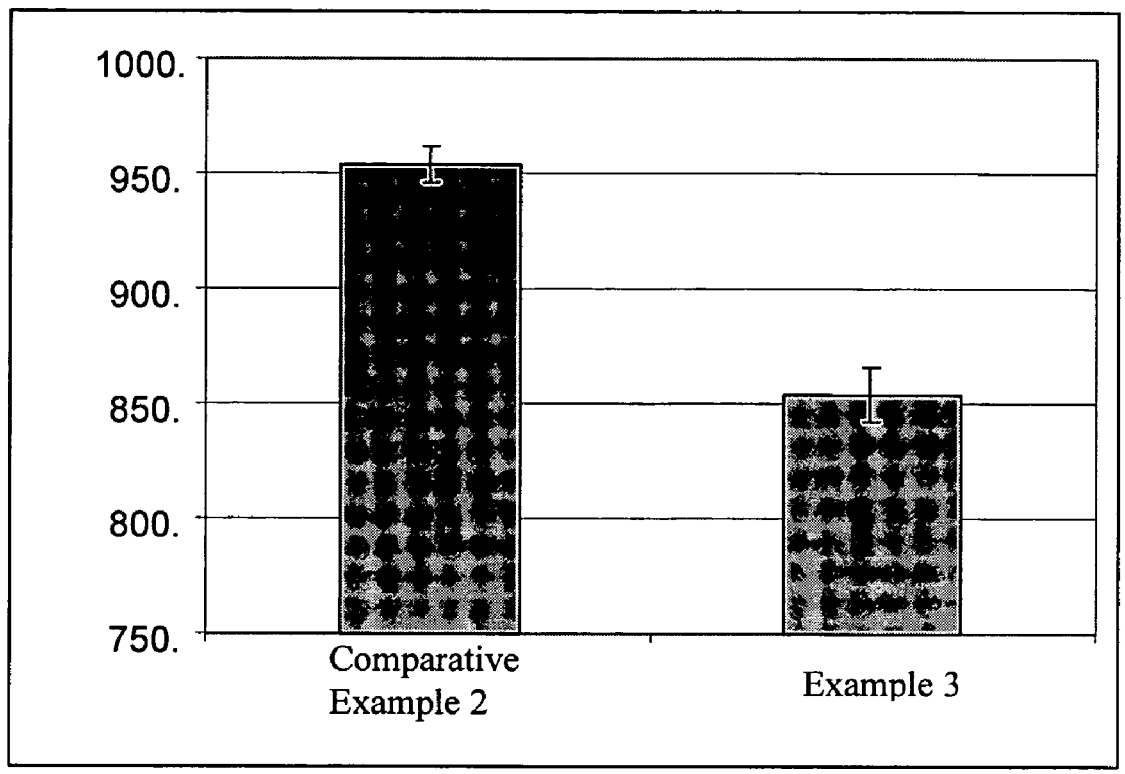
FIG. 3 is a graphic presentation of permeability data for the sealant compositions of Comparative Example 2 and Example 3.

The permeability data for Comparative Example 2 and Example 3 are graphically presented in FIG. 3.

COMPARATIVE EXAMPLE 3 AND EXAMPLES 4 AND 5

The inorganic-organic nanocomposite of Examples 4 and 5 was prepared by introducing 15 grams of octadecyldimethyl (3-trimethoxysilyl propyl)) ammonium chloride (available from Gelest, Inc.) into a 100 ml beaker and slowly adding 50 ml of methanol (available from Merck). 30 grams of Cloisite 15A ("C-15A," a montmorillonite clay modified with 125 milliequivalants of dimethyl dehydrogenated tallow ammonium chloride per 100 g of clay available from Southern Clay Products) clay was added very slowly to a 5 liter beaker containing a water: methanol solution (1:3 ratio, 3.5 L) and equipped with an overhead mechanical stirrer which stirred the mixture at a rate of approximately 400 rpm. The stirring continued for 12 hours. The octadecyldimethyl(3-trimethoxysilyl propyl)) ammonium chloride (prepared above) was then added very slowly. The mixture was stirred for 3 hours. Thereafter, the mixture was filtered through a Buckner funnel and the solid obtained was slurried with a water: methanol (1:3) solution several times before being filtered again. The solid was dried in oven at 80° C. for approximately 50 hours.

The above-indicated blends were then used to make cured sheets as follows: PDMS-silypropyl modified clay formulations were mixed with NPS and DBTO, as listed in Table 3, using a hand blender for 5-7 minutes with air bubbles being removed by vacuum. Each blend was poured into a Teflon sheet-forming mold and maintained for 24 hours under ambient conditions (25° C. and 50% humidity) to partially cure the PDMS components. The partially cured sheets were removed from the mold after 24 hours and maintained at ambient temperature for seven days for complete curing.

TABLE 3

|  | grams | wt % NPS | wt % DBTO |
|---|---|---|---|
| Comparative Example 3: Silanol mixture | 50 | 2 | 1.2 |
| Example 4: Silanol mixture with 5phr of silylpropyl modified clay | 50 | 2 | 1.2 |
| Example 5: Silanol mixture with 10phr of silylpropyl modified clay | 50 | 2 | 1.2 |

The Argon permeability was measured using a gas permeability set-up as in the previous examples. Argon permeability was measured using a gas permeability set-up as in the previous examples. The measurements were based on the variable-volume method at 100 psi pressure and at a temperature of 25° C. Measurements were repeated under identical conditions 2-3 times in order to assure their reproducibility.

Figure 4:
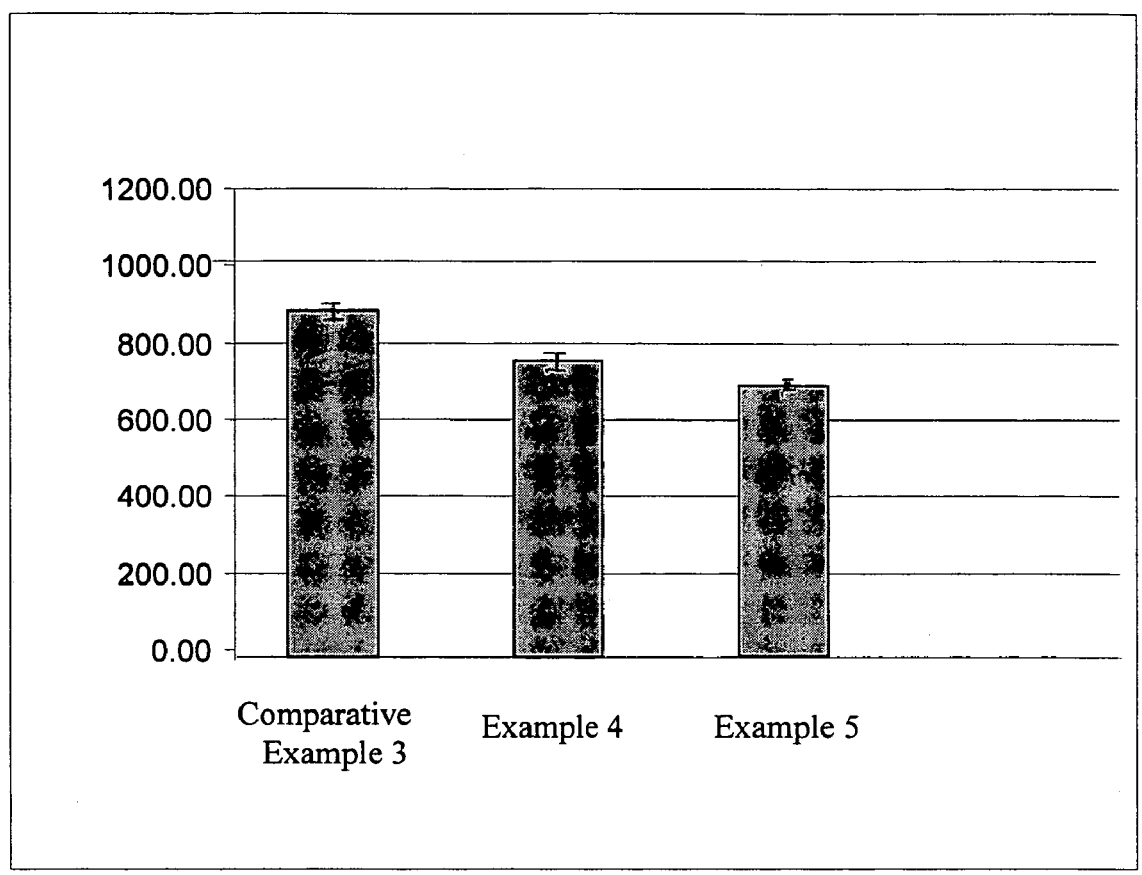
FIG. 4 is a graphic presentation of permeability data for the sealant compositions of Comparative Example 3 and Examples 4 and 5.

The permeability data for Comparative Example 3 and Examples 4 and 5 are graphically presented in FIG. 4.

The permeability data are graphically presented in FIGS. 2, 3 and 4. As shown in the data, argon permeability in the case of the cured sealant compositions of the invention (Examples 1 and 2 of FIG. 2, Example 3 of FIG. 3 and Examples 4 and 5 of FIG. 4) was significantly less than that of cured sealant compositions outside the scope of the invention (Comparative Examples 1-3 of FIGS. 2-4, respectively). In all, while the argon permeability coefficients of the sealant compositions of Comparative Examples 1, 2 and 3 exceed 950 barrers, those of Examples 1-5 illustrative of sealant compositions of this invention did not exceed 875 barrers and in some cases, were well below this level of argon permeability coefficient (see, in particular, examples 2, 4 and 5).

While the preferred embodiment of the present invention has been illustrated and described in detail, various modifications of, for example, components, materials and parameters, will become apparent to those skilled in the art, and it is intended to cover in the appended claims all such modifications and changes which come within the scope of this invention.

What is claimed is:

1. An insulated glass unit comprising at least two spaced-apart sheets of glass in spaced relationship to each other, a low thermal conductivity insulating gas or mixture of gases there between and a gas sealant element including a cured sealant composition resulting from the curing of a curable sealant composition, said cured sealant having an argon permeability coefficient of less than about 900 barrers, comprising:
   a) at least one silanol-terminated diorganopolysiloxane;
   b) at least one crosslinker for the silanol-terminated diorganopolysiloxane(s) which is an alkylsilicate having the formula:

$(R^{14}O)(R^{15}O)(R^{16}O)(R^{17}O)Si$ where $R^{14}$, $R^{15}$, $R^{16}$ and $R^{17}$ are chosen independently from monovalent $C_1$ to $C_{60}$ hydrocarbon radicals;
   c) at least one catalyst for the crosslinking reaction;
   d) a gas barrier enhancing amount of at least one inorganic-organic nanocomposite wherein the inorganic-organic nanocomposite comprises at least one inorganic component which is a layered inorganic nanoparticulate and at least one organic component which is a quaternary ammonium organopolysiloxane having the formula:

$M_a D_b D'_c$ wherein "a" is 2, and "b" is equal to or greater than 1 and "c" is positive; M is $[R^3_z NR^4]_{3-x-y} R^1_x R^2_y SiO_{1/2}$ wherein "x" is 0, 1 or 2 and "y" is either 0 or 1, subject to the limitation that x+y is less than or equal to 2, "z" is 2, $R^1$ and $R^2$ each independently is a monovalent hydrocarbon group up to 60 carbons; $R^3$ is selected from the group consisting of H and a monovalent hydrocarbon group up to 60 carbons; $R^4$ is a monovalent hydrocarbon group up to 60 carbons; D is $R^5 R^6 SiO_{1/2}$ where $R^5$ and $R^6$ each independently is a monovalent hydrocarbon group up to 60 carbon atoms; and D' is $R^7 R^8 SiO_{2/2}$ where $R^7$ and $R^8$ each independently is a monovalent hydrocarbon group containing amine with the general formula:

$[R^9_a NR^{10}]$ wherein "a" is 2, $R^9$ is selected from the group consisting of H and a monovalent hydrocarbon group up to 60 carbons; $R^{10}$ is a monovalent hydrocarbon group up to 60 carbons; and,
   e) at least one solid polymer having a permeability to gas that is less than the permeability of the crosslinked diorganopolysiloxane(s).

2. The insulated glass unit of claim 1 wherein silanol-terminated diorganopolysiloxane (a) has the general formula:

$M_a D_b D'_c$ wherein "a" is 2, and "b" is equal to or greater than 1 and "c" is zero or positive; M is $(HO)_{3-x-y} R^1_x R^2_y SiO_{1/2}$ wherein "x" is 0, 1 or 2 and "y" is either 0 or 1, subject to the limitation that x+y is less than or is equal to 2, $R^1$ and $R^2$ each independently is a monovalent hydrocarbon group up to 60 carbon atoms; D is $R^3 R^4 SiO_{1/2}$;

wherein $R^3$ and $R^4$ each independently is a monovalent hydrocarbon group up to 60 carbon atoms; and D' is $R^5 R^6 SiO_{2/2}$ wherein $R^5$ and $R^6$ each independently is a monovalent hydrocarbon group up to 60 carbon atoms.

3. The insulated glass unit of claim 1 wherein catalyst (c) is a tin catalyst.

4. The insulated glass unit of claim 3 wherein the tin catalyst is selected from the group consisting of dibutyltindilaurate, dibutyltindiacetate, dibutyltindimethoxide, tinoctoate, isobutyltintriceroate, dibutyltinoxide, dibutyltin bis-diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, diorganotin bis β-diketonates and mixtures thereof.

5. The insulated glass unit of claim 1 wherein the inorganic-organic nanocomposite (d) is obtained by contacting the layered inorganic nanoparticulate possessing exchangeable cation which is at least one member selected from the group of $Na^+$, $Ca^{2+}$, $Al^{3+}$, $Fe^{2+}$, $Fe^{3+}$, $Mg^{2+}$, and mixtures thereof, with the quaternary ammonium organopolysiloxane.

6. The insulated glass unit of claim 1 wherein the layered nanoparticulate is at least one member selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, kaolinite and, mixtures thereof.

7. The insulated glass unit of claim 1 wherein solid polymer (e) is selected from the group consisting of low density polyethylene, very low density polyethylene, linear low density polyethylene, high density polyethylene, polypropylene, polyisobutylene, polyvinyl acetate, polyvinyl alcohol, polystyrene, polycarbonate, polyester, polyethylene terephthalate, polybutylene terephthalate, polyethylene napthalate, glycol-modified polyethylene terephthalate, polyvinylchloride, polyvinylidene chloride, polyvinylidene fluoride, thermoplastic polyurethane, acrylonitrile butadiene styrene, polymethylmethacrylate, polyvinyl, fluoride, polyamides, polymethylpentene, polyimide, polyetherimide, polether ether ketone, polysulfone, polyether sulfone, ethylene, chlorotrifluoroethylene, polytetrafluoroethylene, cellulose acetate, cellulose acetate butyrate, plasticized polyvinyl chloride, ionomers, polyphenylene sulfide, styrene-maleic anhydride, modified polyphenylene oxide, ethylene-propylene rubber, polybutadiene, polychloroprene, polyisoprene, polyurethane, styrene-butadiene-styrene, styrene-ethylene-butadiene-styrene, polymethylphenyl siloxane and mixtures thereof.

8. The insulated glass unit of claim 1 including a cured sealant composition further comprising at least one optional component selected from the group consisting of adhesion promoter, surfactant, filler other than inorganic-organic nanocomposite, catalyst, colorant, pigment, plasticizer, antioxidant, UV stabilizer, and biocide.

9. The insulated glass unit of claim 8 wherein the adhesion promoter is selected from the group consisting of n-2-aminoethyl-3-aminopropyltrimethoxysilane, 1,3,5-tris(trimethoxysilylpropyl)isocyanurate, γ-aminopropyltriethoxysilane, γ-aminopropyltrimethoxysilane, aminopropyltrimethoxysilane, bis-γ-trimethoxysilypropyl)amine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, n-ethyl-3-trimethoxysilyl-2-methylpropanamine, and mixtures thereof.

10. The insulated glass unit of claim 8 wherein the surfactant is a nonionic surfactant selected from the group consisting of polyethylene glycol, polypropylene glycol, ethoxylated castor oil, oleic acid ethoxylate, alkylphenol ethoxylates, copolymers of ethylene oxide and propylene oxide and copolymers of silicones and polyethers, copolymers of silicones and copolymers of ethylene oxide and propylene oxide and mixtures thereof.

11. The insulated glass unit of claim 10 wherein the nonionic surfactant is selected from the group consisting of copolymers of ethylene oxide and propylene oxide, copolymers of silicones and polyethers, copolymers of silicones and copolymers of ethylene oxide and propylene oxide and mixtures thereof.

12. The insulated glass unit of claim 8 wherein the filler other than the inorganic-organic nanocomposite is selected from the group consisting of calcium carbonate, precipitated calcium carbonate, colloidal calcium carbonate, calcium carbonate treated with compounds stearate or stearic acid, fumed silica, precipitated silica, silica gels, hydrophobized silicas, hydrophilic silica gels, crushed quartz, ground quartz, alumina, aluminum hydroxide, titanium hydroxide, clay, kaolin, bentonite montmorillonite, diatomaceous earth, iron oxide, carbon black and graphite, mica, talc, and mixtures thereof.

13. The insulated glass unit of claim 1 wherein:
silanol-terminated diorganopolysiloxane (a) has the general formula:

$$M_a D_b D'_c$$

wherein "a" is 2, and "b" is equal to or greater than 1 and "c" is zero or positive; M is $$(HO)_{3-x-y}R^1_x R^2_y SiO_{1/2}$$

wherein "x" is 0, 1 or 2 and "y" is either 0 or 1, subject to the limitation that x+y is less than or is equal to 2, $R^1$ and $R^2$ each independently is a monovalent hydrocarbon group up to 60 carbon atoms; D is $$R^3 R^4 SiO_{1/2};$$

wherein $R^3$ and $R^4$ each independently is a monovalent hydrocarbon group up to 60 carbon atoms; and D' is $$R^5 R^6 SiO_{2/2}$$

wherein $R^5$ and $R^6$ each independently is a monovalent hydrocarbon group up to 60 carbon atoms;
catalyst (c) is a tin catalyst; and,
layered inorganic nanoparticulate portion of inorganic-organic nanocomposite (d) is selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, kaolinite and, mixtures thereof.

14. The insulated glass unit of claim 1 wherein the insulating gas is selected from the group consisting of air, carbon dioxide, sulfur hexafluoride, nitrogen, argon, krypton, xenon, and mixtures thereof.

15. The insulated glass unit of claim 1 wherein the solid polymer (e) is blended in combinations or in the form of coplymers selected from the group consisting of polycarbonate-ABS blends, polycarbonate polyester blends, grafted polymers, silane grafted polyethylenes, and silane grafted polyurethanes.

\* \* \* \* \*